Patented Mar. 15, 1938

2,111,531

UNITED STATES PATENT OFFICE 2,111,531

TREATMENT OF CELLULOSE AND COTTON MATERIALS

William H. Furness, Riverton, N. J., assignor to American Rayon Company, Inc., Riverton, N. J., a corporation of New Jersey No Drawing. Application July 16, 1936, Serial No. 90,920

4 Claims. (Cl. 8—20)

This invention relates to a cuproammonium solvent solution and to the treatment of cellulose and cotton materials. This is a continuation-in-part of my copending application Serial No. 1,901, filed January 15, 1935, now abandoned.

The solution of this invention, in varying degrees of concentration, is useful for treating cotton yarns and fabrics, jute, ramie, and rayon.

I will first describe my preferred method of making the solution.

I prepare the solution preferably as follows: Dissolve 160.7 ounces of copper sulphate

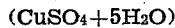

in 21.5 liters of water. Add 8 liters aqua ammonia (26° Bé.) and agitate until the basic copper sulphate first formed is redissolved. Cool this solution to about 15° C. Any iron which is present will quickly settle and may be easily removed. Pour into a mixer and add 12 lbs. of ice, preferably cracked.

Dissolve 52.5 ounces caustic soda (76% Na₂O) in 6 liters of water, cool to about 15° C.; and add 3 lbs. of cracked ice.

Stir each solution until the ice is nearly melted which will simultaneously cool and dilute, bringing the temperature of each to about 4° C. Pour the solutions together and agitate for about 30 seconds, which lowers the temperature below 0° C.

The advantage of cooling with ice is that the cooling occurs at the point of dilution which prevents crystallization as the cooling occurs and secures rapid cooling in large volumes.

Thus far considered, the proportions of chemicals and the dilutions are important and cannot be greatly varied from. The limits of variation may be determined from such considerations as the following: If less water is used in the first solution, crystals of copper tetrammonia sulphate will be formed when the solution is cooled. If less water is used in dissolving the caustic soda a tendency to precipitate copper hydroxide from the solution will be observed. It is an important point in the method that no precipitation occurs in the solvent solution. When the copper and caustic soda solutions described are reduced to a temperature below 4° C. and mixed together, no precipitation of copper hydroxide will occur and there will be no rise in temperature. A change in color occurs, the solution becoming a much darker blue. Until further chemical investigation I assume that under the conditions stated and with the proportion of chemicals given, a double soluble compound is formed.

I do not know whether I am correct in the belief that I form a double salt of copper ammonia and caustic soda. In any event, I believe I form some temporary compound in which there is no copper hydroxide and which, because it is not stable, I believe to be very active. I know that an excess of caustic soda, as much as somewhere about 1%, cuts down the solvent power of my solution over 50%, whereas it does not cut down the solvent power of a solution containing copper hydroxide. If pure caustic soda is employed then I prefer to use 2 molecules of caustic soda to 1 of copper sulphate as giving the most effective and uniform results. In order to permit greater operating latitude in preparation of the solution, I prefer to add some ammonium sulphate to maintain the desired acid balance,—from about 2 grams to 5 grams per liter.

While I prefer to chill the solutions of copper ammonia and of caustic soda this is not absolutely necessary for some purposes. If not resorted to, then the ammonia content must be somewhat increased and care should be taken in adding the caustic soda solution to the copper ammonia solution. It should be added slowly with agitation to avoid localized action and to secure a maximum of the so-called double salt in the solution. If proper care is taken the caustic soda may be added at room temperature.

For the treatment of cotton cloth and the like, I employ a solvent solution of approximately the following composition prepared in either way before described:—.5 lb. copper sulphate in solution, making, with the water, one liter; .164 lb. caustic soda in solution, making, with the water, .3 liter; 2.952 lbs. aqua ammonia, making 1.5 liters; and .4 lb. of ice, or .3 liter; making a total of 3.1 liters. This solution is permanent because of the higher ammonia content. Here, again, the caustic soda is the commercial article containing a small amount of impurities such as sodium carbonate. Hence making allowances for these impurities which have no effect, the caustic soda content is substantially 2 molecules of caustic soda to one of copper sulphate. Here, again, it is desirable to add ammonium sulphate, from 2 to 5 grams per liter, to avoid accidental excess of caustic soda and to ensure the desired ratio of caustic soda to copper sulphate.

In treating cotton cloth with this solvent solution, the cloth is led through the bath, the strength of solution being adjusted to the speed and the nature of the cloth, by reducing or increasing the water content. Here the water content is not critical as before because it is the intention not to dissolve the cloth, as will appear. The solvent solution tends to put the projecting fibers, fuzz or whiskers on the surface of the threads composing the cloth, into solution or partial solution, which solution may be left in place or removed practically in whole or in part from the cloth by adjusting the pressure of the rollers through which the treated cloth is passed or by washing the treated cloth in strongly diluted solvent. In addition to dissolving the fuzz or whiskers, the body of the fibers is apparently partially dissolved and, when set, the fibers are transparent and lustrous in contrast with fibers which have been treated with a solution of copper hydroxide, in which latter case the surface only appears to be attacked and there is what looks like an amorphous, opaque precipitate thereon.

By this treatment the cloth is left substantially free of projecting fibers or fuzz on the surface of the cloth and between the threads in the meshes of the cloth, with the result that it is more sheer. It gives the cloth a much finer finish and a much better feel.

This method may be effectively employed, for example, in producing relatively high grade cloth from a relatively poor grade of material. Also, a greater or less degree of stiffness may be obtained, depending upon how much of the cellulose solution produced on the cloth is removed therefrom by the rollers. In all cases, the cloth remains essentially cotton cloth and the process is to be understood as being distinct from the coating process previously described.

The treated cloth may be dried to drive off the ammonia, and washed with acid and then with water to remove the copper and the acid, respectively, or as hereinafter described.

For the treatment of cotton cloths for wearing apparel, such as shirtings, voiles, and the like, and for treating cotton yarns and knit goods, hosiery, and cloth-covered wire, such as lamp cords, telephone cords, and the like, I prefer a solvent solution of approximately the following composition:

|  | Grams per liter | Molecules |
|---|---|---|
| $CuSO_4 \cdot 5H_2O$ | 75.6 | 1 |
| $NH_3$ | 80.0 | 15.5 |
| $NaOH$ | 24.22 | 2 |
| Water | To make 1 liter |  |

As illustrative of the procedure to be followed in this instance, I will take voile as an example. The cloth is run through a bath of the solvent solution, being subjected to practically instantaneous treatment, preferably not in excess of about 2 seconds and desirably much less. It is, of course, to be understood that the cloth as it leaves the rolls does not at once have to go into the acid bath. The amount of solution left on the cloth determines the length of action. As soon as that amount has been used up, no further action takes place. The cloth is run through at a speed necessary to give this desired short time exposure to the action of the solvent. After leaving the bath, the cloth passes through the usual nip rollers, the pressure of which preferably is in amount to remove the excess solution, having in mind the desired finished appearance, stiffness, drape and hand. The cloth then passes through an acid solution, preferably a 7% sulphuric acid solution, after which it is washed and dried. This gives a firm permanent finish, removes the fuzz, enlarges the openings between threads and somewhat contracts the threads. The solvent solution furthermore penetrates into the body of the fibers, partially dissolving the cellulose which is afterwards regenerated. The threads have a transparent look, differing from the amorphous, pasty appearance of threads treated by a solution of copper hydroxide as hereinbefore pointed out. The cloth may be used in this form or subjected to further treatments known in the art. Excess caustic soda should be avoided.

In the specific examples given the caustic soda is substantially in the proportion of 2 molecules of caustic soda to 1 of copper sulphate. The care exercised in manufacture avoids the presence of any appreciable quantities of free caustic so that there is no swelling effect, as that term is ordinarily understood in this art, characteristic of the use of excess caustic. It will be noted that in some of the examples the ammonia content is somewhat greater than in the first example given, and with these solutions it is not necessary to use them immediately as the greater ammonia content tends to make them more stable. This is done in order to permit operation at room temperature and to make provision for the possibility of temporary shut-downs of solution making equipment. In all cases, however, it is to be preferred to use the solutions as soon as made, while they are most active and when there is less possibility of the presence of copper hydroxide.

The ammonia content may be cut down approximately one-half i. e., to about 7 mols if the treatment is carried out in the cold. It is not desirable to materially increase the ammonia content above about 20 mols for the reason that high ammonia content has a tendency to depolymerize the cellulose molecule and makes a solution which does not tend to stay in place but runs, giving a pasty effect to the surface of the yarn or cloth treated. Of course, if the ammonia content is cut down to about half, the solution should be used immediately, for otherwise undesirable results follow.

Other copper salts may be substituted for the copper sulphate. I have successfully substituted the following: copper sulphate, copper chloride, copper nitrate and copper carbonate.

The procedure followed is the same and essentially the same ratios are employed.

The foregoing processes for treating yarns and fabrics with solvent solutions such as given, and the product thereof, are wholly different from the processes of plasticizing loaded cotton and fabrics and the product of such plasticizing processes. These are of wholly different appearance and properties.

No claim is made herein to the solution itself nor to the method of making it; nor to the treatment of tire cords with it; as these constitute the subject matter of copending applications Serial No. 181,720, filed December 24, 1937 and Serial No. 115,052, filed December 9, 1936.

What I claim is:

1. The process which comprises subjecting yarns and fabrics to an aqueous solution made from copper sulphate, ammonia, caustic soda and water, with the ratio of caustic soda to copper sulphate being 2 mols of caustic soda to one mol. of copper sulphate and at least sufficient ammonia for complete solution, for a period from practically instantaneous up to not over several seconds while retaining the structure of the yarn or fabric, removing excess solution, setting the partially dissolved cellulose, washing and drying the yarn or fabric.

2. The process which comprises subjecting yarns and fabrics to an aqueous solution made from copper sulphate, ammonia, caustic soda and water, in the ratio of copper sulphate 1 mol., ammonia from about 7 mols to about 20 mols, and caustic soda 2 mols, for a period of from practically intantaneous to not over several seconds while retaining the structure of the yarn or fabric, removing excess solution, setting the partially dissolved celulose, washing and drying the yarn or fabric.

3. The process which comprises subjecting yarns and fabrics to an aqueous solution made from copper sulphate, ammonia, caustic soda and water, in the ratio of copper sulphate 1 mol., ammonia about 15 mols, and caustic soda 2 mols, for a period of from practically instantaneous to not over several seconds while retaining the structure of the yarn or fabric, removing excess solution, setting partially dissolved cellulose, washing and drying the yarn or fabric.

4. The process which comprises subjecting yarns and fabrics to an aqueous solution made from copper sulphate, ammonia, caustic soda and water, in the ratio of copper sulphate 75.6 grams per liter, ammonia about 80 grams per liter, caustic soda 24.22 grams per liter and water to make 1 liter, for a period of from practically instantaneous to not over about 2 seconds for such concentration, removing excess solution, setting partially dissolved cellulose, washing and drying the yarn or fabric.

WILLIAM H. FURNESS.